United States Patent
Sunder et al.

(10) Patent No.: US 10,880,014 B1
(45) Date of Patent: Dec. 29, 2020

(54) ACTIVE RELATIVE INTENSITY NOISE MITIGATION USING NESTED INTERFEROMETERS, AND TRANS-IMPEDANCE AMPLIFIER

(71) Applicant: Cisco Technology, Inc., San Jose, CA (US)

(72) Inventors: Sanjay Sunder, Allentown, PA (US); Romesh Kumar Nandwana, Breinigsville, PA (US); Craig S. Appel, Macungie, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/734,246

(22) Filed: Jan. 3, 2020

(51) Int. Cl.
*H04B 10/516* (2013.01)
*H04B 10/50* (2013.01)
*H04B 10/66* (2013.01)
*H04B 10/079* (2013.01)

(52) U.S. Cl.
CPC ... *H04B 10/5051* (2013.01); *H04B 10/07953* (2013.01); *H04B 10/66* (2013.01)

(58) Field of Classification Search
CPC .......................... H04B 10/5057; H04B 10/516
See application file for complete search history.

(56) References Cited

U.S. PATENT DOCUMENTS

| | | | | |
|---|---|---|---|---|
| 6,616,353 | B1* | 9/2003 | Helkey | G02F 1/225 356/450 |
| 8,929,689 | B2 | 1/2015 | Metz et al. | |
| 2002/0159668 | A1* | 10/2002 | Williams | G02F 1/225 385/3 |
| 2007/0206962 | A1* | 9/2007 | Iannelli | H04B 10/588 398/188 |
| 2012/0195600 | A1 | 8/2012 | Winzer | |

FOREIGN PATENT DOCUMENTS

| | | |
|---|---|---|
| EP | 2684083 A2 | 1/2014 |
| WO | 2012141828 A2 | 10/2012 |
| WO | 2015136877 A1 | 9/2015 |

OTHER PUBLICATIONS

C. W. Nelson, A. Hati, and D. A. Howe, "Relative Intensity Noise Suppression for RF Photonic Links," IEEE Photonics Technology Letters, vol. 20, No. 18, pp. 1542-1544, Sep. 2008.
Mamoru Endo, Tyko D. Shoji, Thomas R. Schibli, "High-Sensitivity Optical to Microwave Comparison With Dual-Output Mach-Zehnder Modulators," Dec. 2018 p. Nos. [01-06].

* cited by examiner

*Primary Examiner* — Shi K Li
(74) *Attorney, Agent, or Firm* — Patterson + Sheridan, LLP

(57) ABSTRACT

Active relative intensity noise mitigation in nested interferometers using trans-impedance amplifiers is provided by splitting an optical carrier signal into a first version and a second version, wherein the first version is orthogonal to the second version; re-combining predefined portions of the first version and the second version to determine a noise level; modulating at least one of the first version and the second version based on the noise level to reduce the noise level; after modulating the at least one of the first version and the second version based on the noise level, encoding data onto at least one of the first version and the second version; and recombining the first version and the second version to transmit the data.

20 Claims, 6 Drawing Sheets

US 10,880,014 B1

ACTIVE RELATIVE INTENSITY NOISE MITIGATION USING NESTED INTERFEROMETERS, AND TRANS-IMPEDANCE AMPLIFIER

TECHNICAL FIELD

Embodiments presented in this disclosure generally relate to drivers for use with Mach-Zehnder Interferometers (MZI) and other optical modulators. More specifically, embodiments disclosed herein reduce Relative Intensity Noise (RIN) from the optical signal generator (e.g., a laser light source) independently of the data modulated over the MZI and the associated noise imparted by the modulators or data source.

BACKGROUND

In various photonic circuit elements, such as switches, modulators, and Variable Optical Attenuators (VOA), input optical signals are split and/or combined to produce various output optical signals of desired amplitudes. In an MZI or other modulator with two arms, a carrier signal is split onto the two arms, and one or more modulators encode data onto the carrier signal, before being recombined for transmission. Various sources of noise may affect the clarity of the final signal, such as, for example, the construction and response time of the modulators, imperfections in the transmission media (e.g., optical fibers, waveguides) within the arms, and variance in the light source that generates the carrier signal. Instability in the power level of the light source imparts RIN to the carrier signal, which limits the overall Signal to Noise Ratio (SNR) of all downstream components in the modulator, and limits the bandwidth and quality of the transmitted signal.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
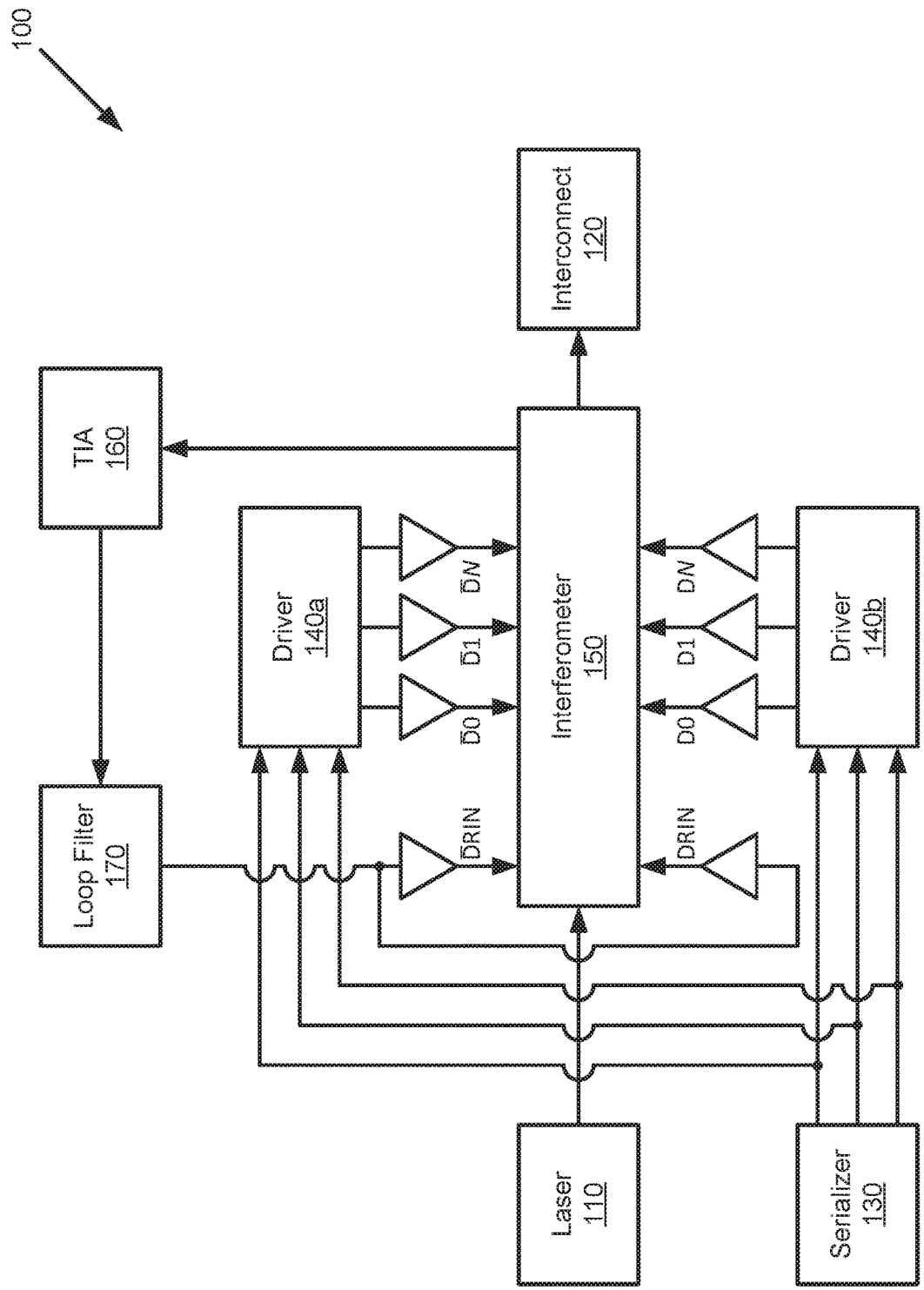
FIG. 1 illustrates example components of an optical signaling device, according to embodiments of the present disclosure.

One embodiment presented in this disclosure is a method that includes: splitting an optical carrier signal into a first version and a second version, wherein the first version is orthogonal to the second version; re-combining predefined portions of the first version and the second version to determine a noise level; modulating at least one of the first version and the second version based on the noise level to reduce the noise level; after modulating the at least one of the first version and the second version based on the noise level, encoding data onto at least one of the first version and the second version; and recombining the first version and the second version to transmit the data.

One embodiment presented in this disclosure is a device that includes: a first signal arm, including: a first input connected to a light source; a first output connected to a transmission line; a first set of signal modulators connected between the first input and the first output; a first Relative Intensity Noise (RIN) modulator connected between the first input and the first series of signal modulators; and a first tap connected between the first RIN modulator and the first series of signal modulators; a second signal arm, including: a second input connected to the light source; a second output connected to the transmission line; a second set of signal modulators connected between the second input and the second output; a second RIN modulator connected between the second input and the second series of signal modulators; and a second tap connected between the second RIN modulator and the second series of signal modulators; a logic circuit, connected to the first tap and the second tap configured to drive the first RIN modulator and the second RIN modulator based on a difference between signals carried by the first tap and the second tap.

One embodiment presented in this disclosure is an optical signaling device that includes: a laser, configured to generate an optical carrier signal; an interferometer, configured to receive the optical carrier signal from the laser; a driver, configured to encode a data signal onto the optical carrier signal in the interferometer; an interconnect, configured to receive an output from the interferometer; and a trans-impedance amplifier, configured to receive a Relative Intensity Noise (RIN) level of the laser as measured within the interferometer and to drive a RIN modulator within the interferometer based on the RIN level to mitigate an amplitude of the RIN level.

Example Embodiments

The present disclosure provides for the active cancellation or reduction of RIN from a light source within the structure of the modulator independently of the data encoded onto the optical carrier. By combining two versions of the optical carrier after being phase shifted, but before the data are encoded onto the optical carriers, a trans-impedance amplifier (TIA) and loop filter can monitor the post-correction RIN output to adjust the signal characteristics of the optical carrier before data are encoded thereon. By actively correcting the RIN on the optical carrier before encoding data thereon, the detection and removal of RIN can be performed with a simpler correction logic controller, and the correction can be implemented with fewer tuning steps and less power. Additionally, by using less power to overcome the RIN, an optical signaling device experiences less thermal degradation, thus extending the lifetime of that device and improving the reliability thereof.

FIG. 1 illustrates example components of an optical signaling device 100, according to embodiments of the present disclosure. The optical signaling device 100 may be constructed on a single chip or multiple chips to generate an optical carrier signal, mitigate RIN within the optical signaling device 100, impart data (via modulation) onto the carrier signal, and transmit the data on the carrier signal to an external device. Although various components of the optical signaling device 100 are illustrated, one of skill in the art will recognize that other components may also be included in the optical signaling device 100, such as, for example, various taps or probes to monitor signal characteristics, a power source, amplifiers, filters, etc.

A laser 110, or other light source, generates an optical carrier signal (e.g., a continuous wave (CVV) optical signal), which is output through an interconnect 120 to an external device or transmission medium (e.g., an optical fiber or waveguide). An interferometer 150 in the signal path between the laser 110 and the interconnect 120 splits the optical signal into two versions, which are each phase shifted and/or modulated to account for RIN and to encode data for transmission, and then recombined for transmission. The interferometer 150 and components thereof are discussed in greater detail in regard to FIG. 2.

A serializer 130 receives the data to be encoded onto the optical carrier signal as electrical inputs from an external device and serializes according to an externally provided clock signal or an internal clock. The serializer 130 may receive the data as a packet or in another electronic format and provides the data to a first driver 140a and a second driver 140b (generally, drivers 140). The drivers 140 control signal modulators (discussed in greater detail in regard to FIG. 2) within an interferometer 150 to modulate the carrier signal to encode the data thereon. The serializer 130 spaces the data transmission for encoding by the drivers 140 to account for signal propagation delay within the optical signaling device 100 so that the interferometer 150 can encode the data reliably onto the optical carrier signal.

As illustrated, the first driver 140a and the second driver 140b apply complementary signals (e.g., $D_0$ versus $\overline{D}_0$) to opposing arms within the interferometer 150 so that the effects of the data encoding can constructively or destructively interfere when the interferometer 150 recombines the signals carried on each arm. For example, when carrying an optical carrier signal of amplitude X, each opposing arm in the interferometer 150 nominally carries a version of the optical carrier signal of amplitude X/2, with the first arm carrying a complement of the signal carried on the second arm (e.g., X/2 versus −X/2). In some embodiments, only one of the first driver 140a or the second driver 140b is used at a given time; applying either D or $\overline{D}$ to the associated arm of the interferometer 150 to encode a given value onto the optical carrier signal. In other embodiments, the first driver 140a encodes the complement of the value encoded by the second driver 140b. In some embodiments, only one driver is provided, with amplifiers providing D and/or inverting amplifiers providing $\overline{D}$ to the associated arms of the interferometer 150. When active, drivers 140 encode the data to the optical carrier signal via one or more modulators in an associated arm of the interferometer 150 for different modulation formats (e.g., for PAM-N modulation $D_0$ to $D_N$ will carry different data while for NRZ transmission all the modulators $D_0$-$D_N$ will carry the same data). Additionally, in some embodiments, a one-segment driver can linearly drive multi-level data.

The interferometer 150 is in communication with a transimpedance amplifier (TIA) 160, to which the interferometer 150 provides a RIN output as an input. The TIA 160 converts the current of the RIN out from the interferometer 150 into a voltage measurement that is used by the loop filter 170 to control modulators within the interferometer 150 to cancel or mitigate the RIN of the laser 110 before the data are encoded onto the optical signal by the drivers 140. In various embodiments, the loop filter 170 and the TIA 160 may be tuned to a given bandwidth of the optical carrier signal to remove RIN in a given frequency/wavelength band of the optical carrier signal. In various embodiments, a user may program the loop filter 170 and the TIA 160 so as to use less power in reducing the RIN in a narrower band of particular interest rather than in a broader band, or to more effectively use a set amount of power to remove the RIN of greatest effect on the end signal. The TIA 160 and components thereof are discussed in greater detail in regard to FIG. 3.

The loop filter 170 can be a passive or an active filter with various P, PI, or PID orders of control that receives input from the TIA 160 to track the amplitude of the input of the optical or electrical RIN level signal from the TIA 160 and thereby control one or more modulators in the interferometer 150 to reduce the RIN in the optical carrier signal at the same frequencies. In various embodiments, the TIA 160 and loop filter 170 bandwidth are tuned to the relaxation frequency of the laser 110, but may be tuned to other frequencies/wavelengths of interest in some embodiments.

Figure 2:
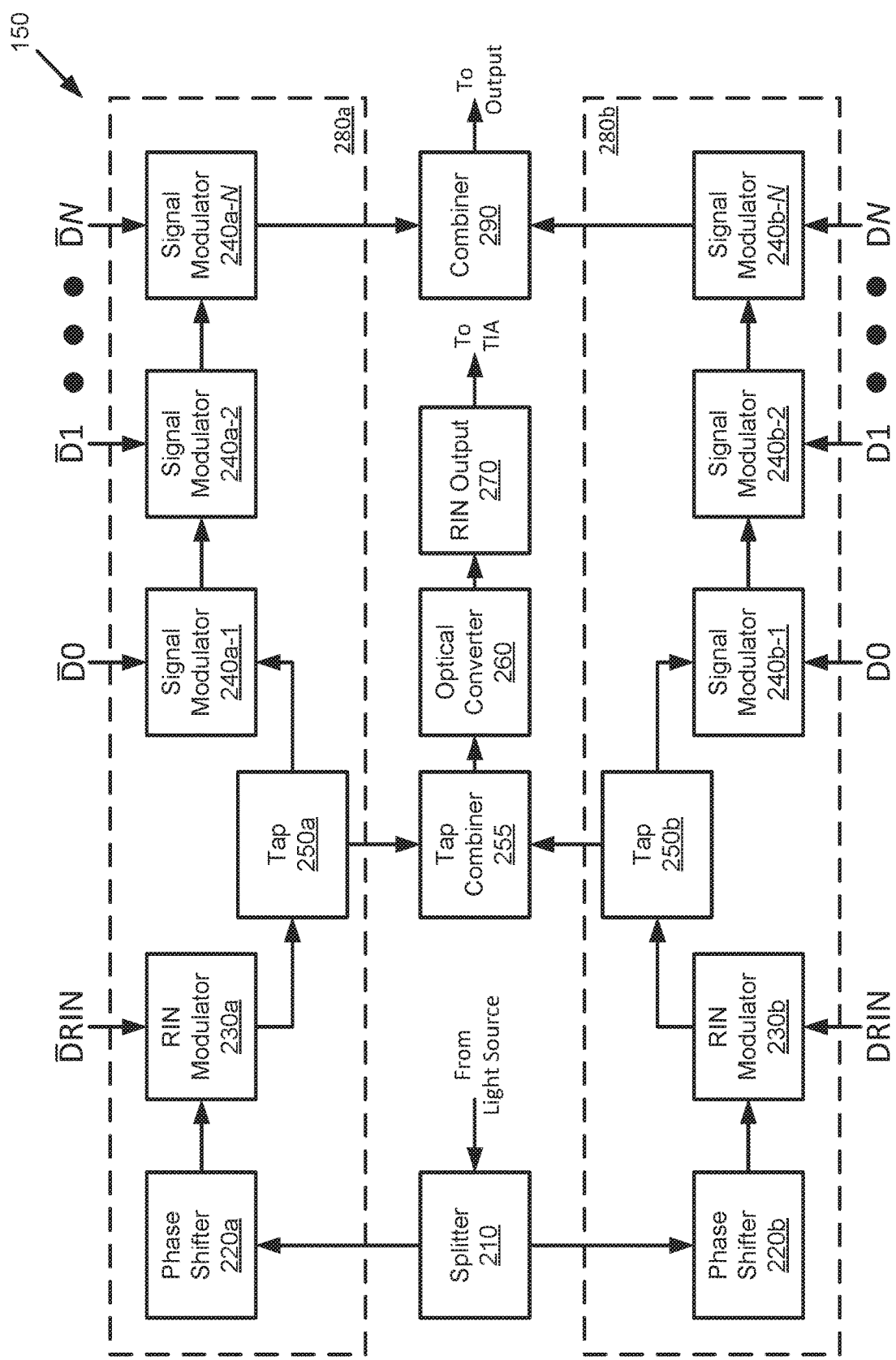
FIG. 2 illustrates example components of the interferometer, according to embodiments of the present disclosure.

FIG. 2 illustrates example components of the interferometer 150, according to embodiments of the present disclosure. The interferometer 150 includes a splitter 210, which is connected to the laser 110 or other light source, and splits optical carrier signals provided from the laser 110 onto a first signal arm 280a and a second signal arm 280b (generally, signal arms 280). Each of the signal arms 280 carry a respective version of the optical carrier that is approximately half the power of the original optical carrier, and applies various phase shifts and modulations to the optical carrier to encode data before being recombined by the combiner 290 for transmission. The combiner 290 is connected at the output side of each of the signal arms 280, and at an input side to the interconnect 120, and is configured to re-combine the signals carried on each of the signal arms 280 into an output signal for transmission. The splitter 210 and the combiner 290 can be realized as active or passive Y-junctions (amplifying or filtering one or more legs) or with other junction geometries in various embodiments, which may include various taps for measuring the characteristics of the signals carried thereon.

Each of the signal arms 280 includes a phase shifter: a first phase shifter 220a on the first signal arm 280a and a second phase shifter 200b on the second signal arm 280b (generally, phase shifters 220), which is a physical component that shifts the phase of a signal carried through that component. The embodiments herein can be used with various types of phase shifters 220 (both passive and active) to affect the phase of a signal carried in a given one of the signal arms 280, which may operate based on varying principals. For example, thermo-optic phase shifters 220 apply a controlled temperature to the transmission path of the one of the signal arms 280 through which a signal is transmitted to affect a phase at which the signal exits the phase shifters 220. In some embodiments, the phase shifters 220 may be an electro-optic material, such as lithium niobate. Each of the phase shifters 220 ideally affects only the phase of signals passed therethrough, but in operation some losses in amplitude may be experienced, and different phase shifters 220 may impart different losses. By shifting the relative phases of signals carried on parallel signal arms 280, the phase shifters 220 align the respective signals to cause destructive or constructive interference at the combiner 290; extinguishing or amplifying the amplitude of one or more signals.

In various embodiments, the phase shifters 220 are configured to produce two versions of the optical carrier that are orthogonal (e.g., quadrature biased) to one another or offset by another desired phase difference. Stated differently, the phases of the two versions of the optical carrier are offset by π/2 radians. In some embodiments, the first phase shifter 220a may apply a phase offset of π/4 radians to the optical carrier, while the second phase shifter 220b may apply a phase offset of −π/4 radians to the optical carrier (or apply no offset) to set the two versions as orthogonal of one another. In some embodiments, the second phase shifter 220b may be unpowered or omitted. In some embodiments, both the first phase shifter 220a and the second phase shifter 220b apply offsets (e.g., +π/4 and −π/4 radians, +3π/8 and −π/8 radians) to the optical carrier to produce two versions of the optical carrier with various offsets (e.g., orthogonal). In some embodiments, the phase shifters 220 can account for phase shifts imparted by components downstream from the phase shifters 220 so that the two versions of the optical signal carried on the respective signal arms 280 are orthogonal (or at another predefined relative phase) when combined at the combiner 290.

The first signal arm 280a and the second signal arm 280b are also illustrated as including a first set of signal modulators 240a-1 through 240a-N and a second set of signal modulators 240b-1 through 240b-N (generally, signal modulators 240). Although each set of signal modulators 240 is presented as including three signal modulators 240, more or fewer than three signal modulators 240 can be incorporated in each of the signal arms 280 in other embodiments. Each of the signal modulators 240 includes an active portion, which imparts a controlled, variable modulation to the phase of a carried signal based on a supplied voltage, and may optionally include an amplifying portion to offset any losses in signal strength inherent to the signal modulators 240. In addition to phase modulation, the signal modulators 240 may also induce variable amplitude modulation to boost the strength of signals carried through that component.

In various embodiments, a variable portion of the signal modulators 240 may be a low-doped semiconductor in a semiconductor-insulator-semiconductor-capacitor (SIS-CAP) arrangement that imparts a variable drop or gain in optical signal strength. In other embodiments, a forward-biased PIN diode or a reverse biased PN junction device may be used in variable portion of the signal modulators 240. The variable portion is controlled according to an associated driving signal (e.g., $D_0, D_1, \ldots D_N$ or $\overline{D}_0, \overline{D}_1, \ldots \overline{D}_N$) that encodes data onto the optical carrier by increasing or decreasing modulation order for multi-level signaling scheme (e.g., PAM-4 (Pulse Amplitude Modulation, level 4), PAM-8, etc.).

Between the phase shifters 220 and set of signal modulators 240 on each of the signal arms 280 are included RIN modulators 230 and taps 250 (e.g., a first RIN modulator 230a and first tap 250a on the first signal arm 280a and a second RIN modulator 230b and second tap 250b on the second signal arm 280b).

The RIN modulators 230, similarly to the signal modulators 240, include an actively controlled portion, which imparts a controlled, variable phase modulation to the phase of a carried signal based on a supplied voltage, and may optionally include a fixed portion to apply a fixed gain to offset any losses inherent to the RIN modulators 230. In addition to phase modulation, RIN modulators 230 may also induce a controlled, variable amplitude modulation to boost the strength of signals carried through that component. In contrast to the signal modulators 240, the variable portion of the RIN modulators 230 are controlled by a driving linear analog signal $D_{RIN}$ or $\overline{D}_{RIN}$ received from the loop filter 170 fed from the TIA 160. The TIA 160 in turn is fed from a combined signal from the RIN output 270 of the interferometer 150.

The taps 250 are connected between the RIN modulators 230 and the set of signal modulators 240 on the respective one of the signal arms 280 and (via a tap combiner 255) to an optical converter 260 shared by the signal arms 280. In various embodiments, the taps 250 are evanescent couplers that parasitically divert a predefined or programmable percentage of the signal amplitude from the waveguide running between the RIN modulators 230 and the set of signal modulators 240 on a respective one of the signal arms 280 to the optical converter 260 via the tap combiner 255. In some embodiments, the taps 250 are uneven Y-junctions that receive the carrier signal from the RIN modulators 230 at an input and split the carrier signal to have X % of the original signal strength provided to the set of signal modulators 240 from a first output and to have (1−X) % of the original signal strength provided to the optical converter 260 from a second output. In various embodiments, the taps 250 draw 5% or less of the original signal strength from the optical carrier from each of the signal arms 280. The taps 250 are located downstream (i.e., later in the signal pathway) from the associated RIN modulators 230 and upstream (i.e., earlier in the signal pathway) from the sets of signal modulators in each of the signal arms 280. Accordingly, the taps 250 provide feedback adjustments to the how well the RIN modulators 230 are mitigating the RIN level of the optical carrier independently of data encoded on the signals and without the sets of signal modulators affecting the measurement.

In some embodiments, the strength of the taps 250 can be programmatically controlled to draw a variable amount of the carrier signals from the respective signal arms 280 based on the quality of the light source and/or the quality of the RIN cancellation desired. For example, when the permissible amount of RIN is lower (i.e., the quality of RIN cancellation is higher) a greater amount of the carrier signals may be drawn by the taps 250 than when the permissible amount of RIN is higher. In other embodiments, the percentage drawn from each of the taps 250 can be programmatically set to counteract difference in the arms of the splitter 210 (e.g., a 49% vs 51% split to the signal arms 280), the tap combiner 255, or signal paths in the signal arms 280 so that the two signals are combined at equal strengths at the optical combiner 290.

The optical combiner 290 receives the predefined portion of the optical carrier on each of the signal arms 280 from the respective taps 250, and combines the signals. Because the signals carried on each of the signal arms 280 are complements of one another, ideally the signals should maintain a constant DC value when combined. For example, with an optical carrier represented as a sinusoidal time function (e.g., sin(t)), the orthogonal (e.g., sin(t+π/2)) would ideally constructively interfere with the original function and increase out the amplitude thereof (e.g., sin(t)+sin(t+π/2)<1). However, due to noise in the signal, the resulting combination of the two signals from the taps 250 may be non-zero frequency dependent values, which represented the RIN (and other noise) introduced to the optical signal. The optical converter 260 converts the optical signal representing the RIN into an electrical signal, which is provided to the RIN output 270 for provision to the TIA 160.

Figure 3:
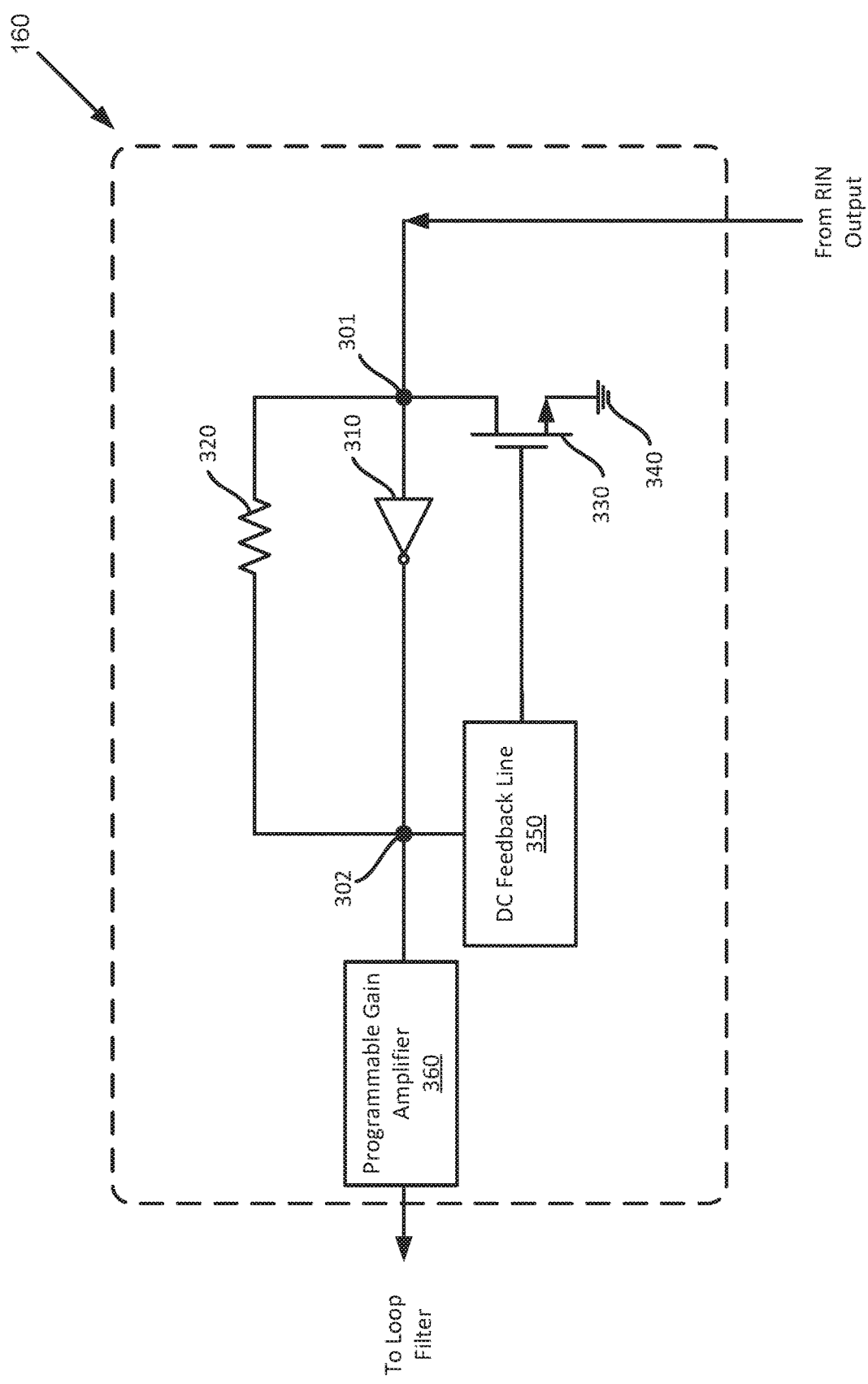
FIG. 3 illustrates a trans-impedance amplifier, according to embodiments of the present disclosure.

FIG. 3 illustrates a TIA 160, according to embodiments of the present disclosure. The TIA 160, along with the loop filter 170, provide a logic circuit to drive the RIN modulators 230 to counteract the RIN observed from the light source. The TIA 160 amplifies the RIN signal to a usable voltage for regulating the loop filter 170, and acts as a low-pass filter for input to the loop filter 170.

The TIA 160, at a first node 301, receives the measured RIN from the RIN output 270 of the interferometer 150 as an input. An inverting amplifier 310 and a resistor 320 are connected in parallel between the first node 301 and a second node 302 to translate RIN output current to voltage and amplify the RIN measure to the loop filter 170. In various embodiments, the resistance of the resistor 320 is tunable/adjustable to allow an operator to adjust the output of the TIA 160 to the relaxation frequencies in the laser 110 or other frequencies of interest for canceling or reducing RIN from.

A current source 330 (such as a Metal Oxide Field Effect Transistor (MOSFET) or other powered semiconductor device) is disposed between the first node 301 and ground 340, and is controlled via a direct current (DC) feedback line 350 connected to a gate of the current source 330 to conduct the DC offset part of measure RIN signal to ground while passing the frequency dependent RIN to the loop filter 170.

A programmable gain amplifier 360 can be disposed between the second node 302 and the loop filter 170 to normalize and/or amplify the frequency dependent portion of the RIN for the analysis and control of the loop filter 170.

Figure 4:
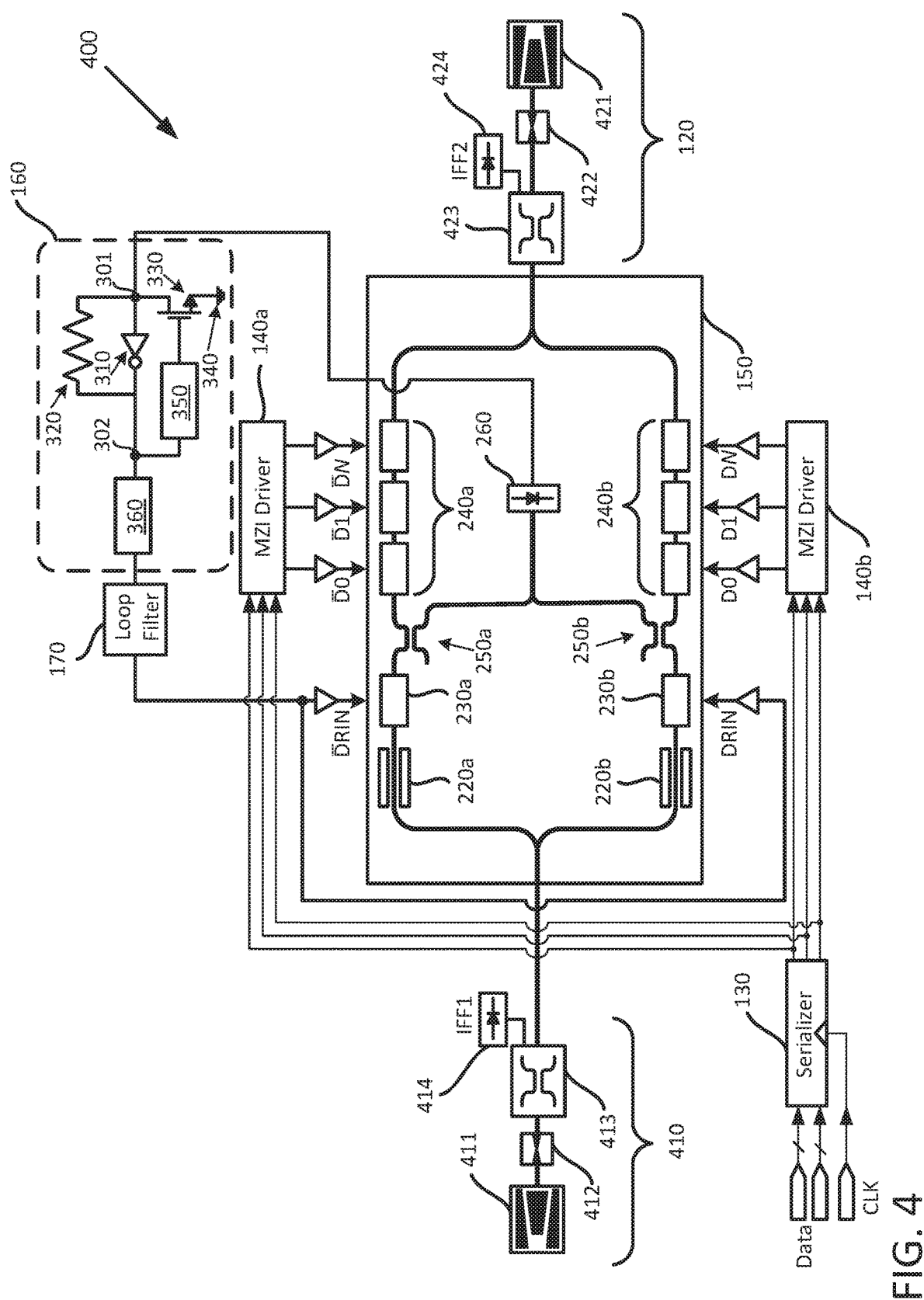
FIG. 4 illustrates a layout of an optical signaling device on a circuit, according to embodiments of the present disclosure.

FIG. 4 illustrates a layout of an optical signaling device 100 on an integrated circuit 400, according to embodiments of the present disclosure. The integrated circuit 400 can include some or all of the elements of the optical signaling device 100 described in FIG. 1, the interferometer 150 described in FIG. 2, and the TIA 160 described in FIG. 3, as well as additional components. For example, the laser 110 may be included in the integrated circuit 400 or be fabricated on a separate chip from the other components of the optical signaling device 100 can be linked to the interferometer 150 via a laser interconnect 410.

In embodiments using a laser interconnect 410, the laser interconnect 410 includes a fastener 411 to hold the laser 110 in place. The waveguides of the laser 110 are aligned at an input optical coupling 412 relative to the waveguides of the interferometer 150 used to receive light (e.g., to couple nitride waveguides in the laser interconnect 410 to silicon waveguides in the interferometer 150), but may be omitted in some embodiments (e.g., when the laser interconnect 410 and the interferometer 150 are pre-integrated or have matching refractive indices). The input optical coupling 412 may include various optical coatings and surface treatments to reduce back reflection and other aberrant optical signaling conditions, and may include butt-coupled joints and evanescent joints to receive the optical carrier signal from the laser 110 and transmit that optical carrier signal to the interferometer 150. Additionally, an input tap 413 can be included to measure a predefined percentage of the amplitude of the optical carrier signal carried thereover (e.g., 5%), the output of which may be provided as an electrical output for use by a controller (e.g., on an external logic circuit) by an input optical converter 414 (e.g., a photodiode to convert optical signals to electrical signals).

In some embodiments the interconnect 120 includes similar elements as the laser interconnect 410, but on the output side of the interferometer 150. Accordingly, the interconnect 120 can provide a logic circuit with details on the signal characteristics of the output data-encoded signal from the interferometer 150 and ensure a proper connection with an external device or optical cable for transmission. An output tap 423 can be included to measure a predefined percentage of the strength of the data-encoded optical carrier signal carried thereover (e.g., 5%), the output of which may be provided as an electrical output for use by a controller (e.g., on an external logic circuit) by an output optical converter 424 (e.g., a photodiode to convert optical signals to electrical signals). An output fastener 421 is included to hold the output waveguides of interferometer 150 in alignment at an output optical coupling 422 with the transmission cables or external device receiving the data-encoded signal (e.g., to couple nitride waveguides in the interconnect 120 to silicon waveguides in the interferometer 150), but may be omitted in some embodiments (e.g., when the interconnect 120 and the interferometer 150 are pre-integrated or have matching refractive indices). The output optical coupling 422 may include various optical coatings and surface treatments to reduce back reflection and other aberrant optical signaling conditions, and may include butt-coupled joints and evanescent joints to receive the data-encoded signal from the interferometer 150 and transmit the data externally from the integrated circuit 400.

Figure 5:
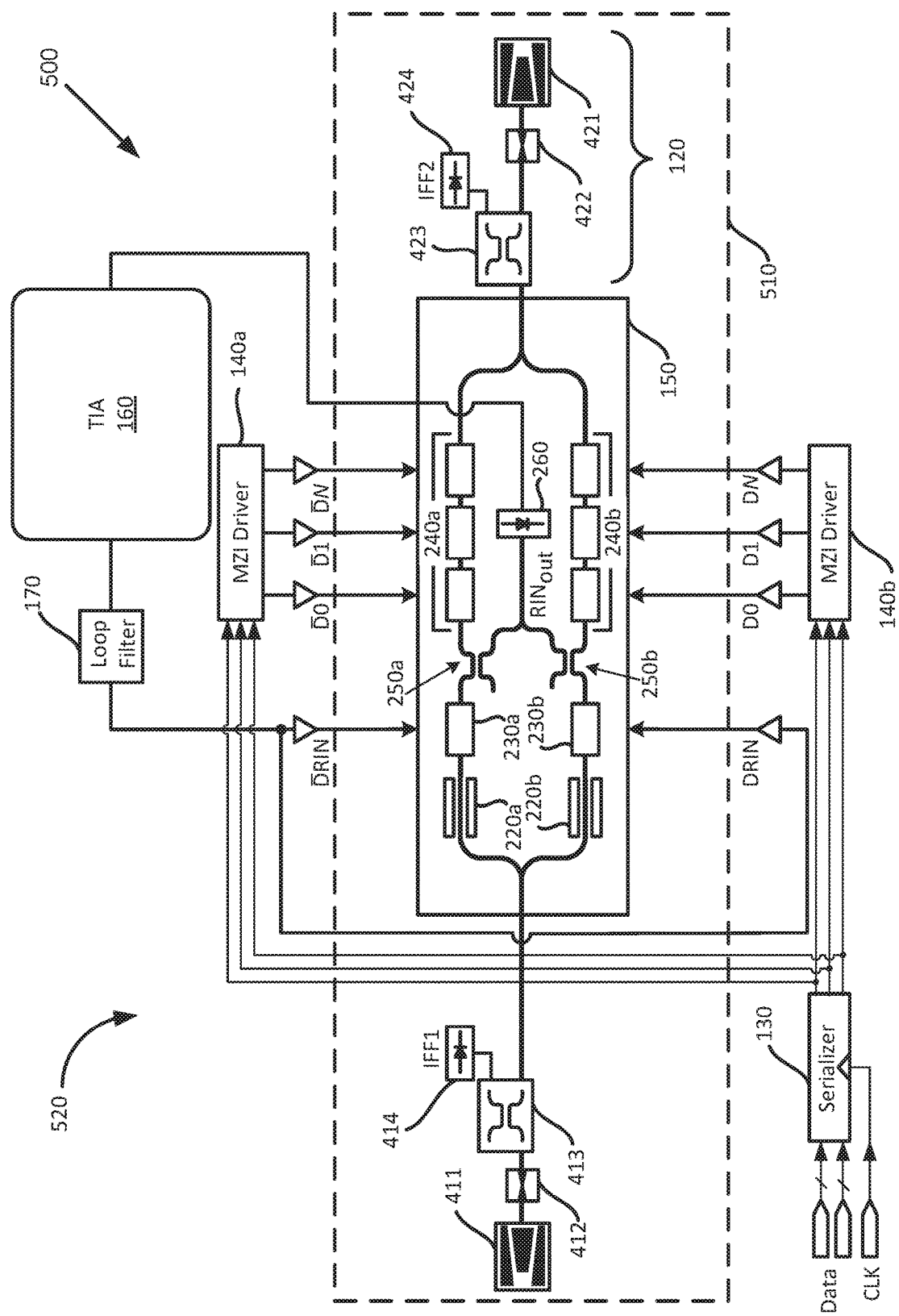
FIG. 5 illustrates a piecewise layout of an optical signaling device on two or more integrated circuits, according to embodiments of the present disclosure.

FIG. 5 illustrates a piecewise layout 500 of an optical signaling device 100 on two or more integrated circuits, according to embodiments of the present disclosure. As will be appreciated, different components of an optical signaling device 100 may be fabricated according to different processes, and fabricators may produce various components as modular entities that can be swapped in or out of different optical signaling devices 100 (or other circuits) as engineering requirements dictate. Additionally, the physical structures of one component may be incompatible with the construction processes of another component. Therefore, a fabricator may desire to layout the optical signaling device in one or more a photonic integrated circuits (PICs) 510 that include the optical components of the optical signaling device 100, and in one or more electrical integrated circuit (EIC) 520 that include the electrical components of the optical signaling device 100.

The PIC 510 and the EIC 520 may be fabricated on separate wafers with several dies defining several instances of the respective PICs 510 or EICs 520 that use different substrates, deposition or growth processes, and/or form different sub-components made of different materials. The PICs 510 and EICs 520 can be combined into the optical signaling device 100 by various wire bonds, interposer circuits, or direct connections between the associated electrical inputs and outputs of the PICs 510 and EICs 520. For example, a wire may be connected to an output of one of the drivers 140 and to the input of one of the signal modulators 240 to allow the driver to electrically control the signal modulator. In another example, the RIN output 270 may be connected to a trace on an interposer circuit that is also connected to the input of the TIA 160 to supply the TIA 160 with an electrical signal corresponding the RIN of the optical carrier.

Figure 6:
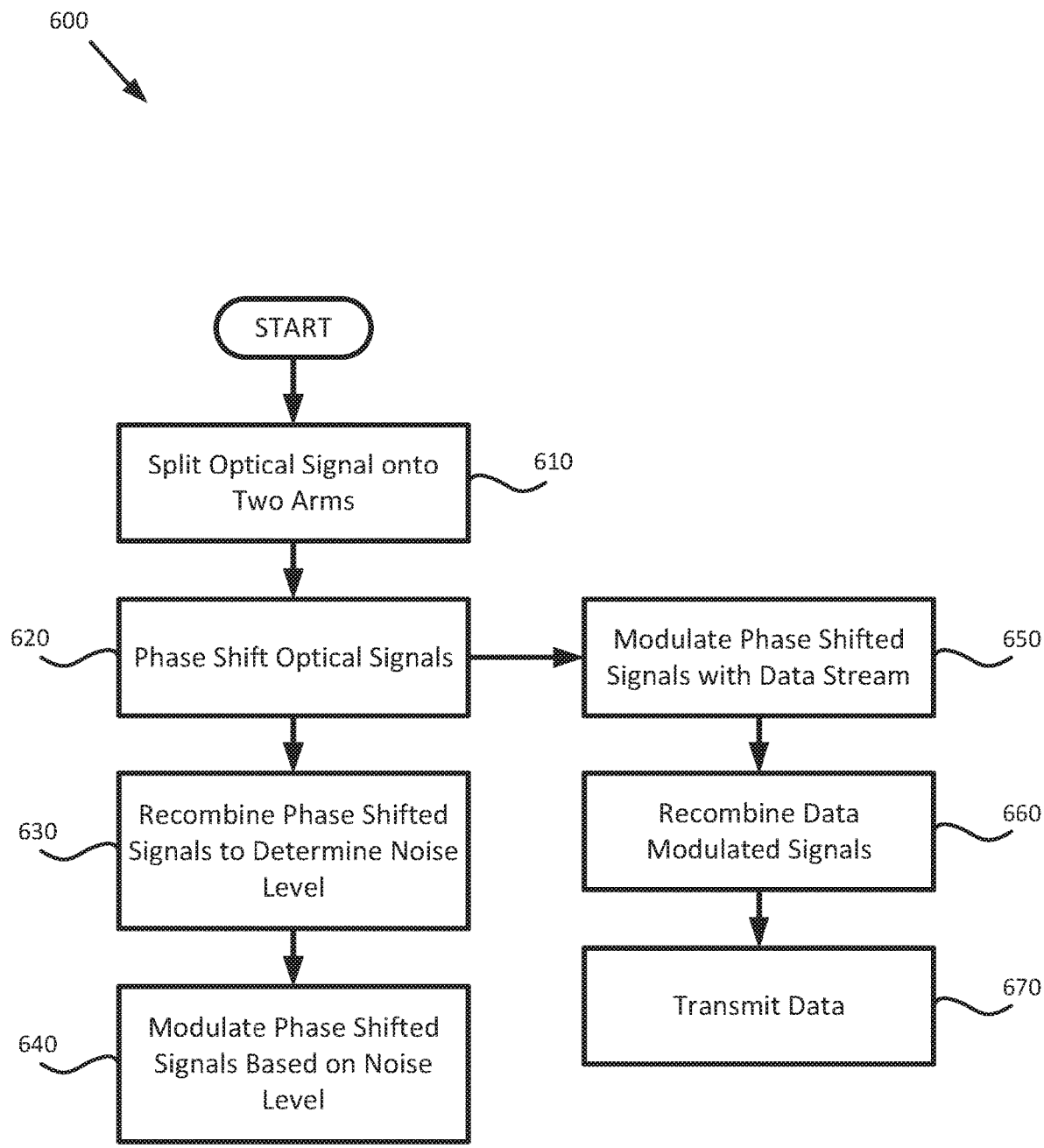
FIG. 6 is a flowchart of a method for cancelling or reducing the relative intensity noise in an interferometer, according to embodiments of the present disclosure.

FIG. 6 is a flowchart of a method 600 for cancelling or reducing the RIN in an interferometer 150, according to embodiments of the present disclosure. Method 600 begins with block 610, where the interferometer 150 splits an optical carrier signal (e.g., received from a laser 110 at a splitter 210) into two signal arms 280a, 280b as a first version and a second version (respectively) of the optical carrier signal.

At block 620, the interferometer 150 phase shifts at least one of the versions of the optical carrier signal such that the versions of the optical carrier signals on each of the signal arms 280 are complements of one another. In some embodiments, one version remains un-phase shifted, while the interferometer 150 phase shifts the other version by $\pi/2$ radians. In other embodiment, the interferometer 150 phase shifts both versions of the optical carrier signal to produce orthogonal versions of the optical carrier signal on each of the signal arms 280.

Method 600 proceeds to block 630 from block 620, where an optical converter 260 in the interferometer 150 recombines predefined portions of the phase shifted carrier signals to determine a noise level in the carrier optical signal; the RIN level. The optical converter 260 receives the portions of the phase shifted carrier signals via taps 250 on the associated signal arms which carry complementary signals.

At block 640, at least one of the RIN modulators 230 in the interferometer 150 modulates the phase shifted signal carried on that signal arm to mitigate the noise level due to RIN on that signal arm. Any difference in the complementary signals is the RIN (determined per block 630), is provided to a TIA 160 and loop filter 170 to drive one or more of the RIN modulators 230 to counteract the observed RIN.

In parallel with and independently of the detection and mitigation of the observed RIN (per block 630 and block 640), the interferometer 150 modulates the phase shifted signals according to the data stream at block 650. Method 600 may continue through blocks 610 through 640 until such time as the light source is turned off. Method 600 may then conclude.

At block 650, one or more sets of signal modulators 240 encode the data stream onto the optical carrier signal, which are controlled by an associated driver. In various embodiments, the signal arm on which the set of signal modulators 240 are active may be the same or a different signal arm that a RIN modulator is active on to mitigate the effect of the RIN on the optical carrier signal.

At block 660, a combiner 290 in the interferometer 150 re-combines the two versions of the optical carrier signal to produce a combined modulated signal that encodes the data on the optical carrier signal, and at block 670 transmits the data on the combined modulated signal to an external device via the interconnect 120.

Method 600 may continue through blocks through 650-670 until such time as there are no more data to encode on the optical carrier signal. In some embodiments, the interferometer 150 may keep the light source active (i.e., producing the optical carrier signal) even when there are no data to encode onto the optical carrier signal, and may selectively perform blocks 650-570 where there are data to encode. In other embodiments, when there are no more data to encode, the interferometer 150 may keep the light source active for a preset period of time before turning off the light source to conserve power, at which time method 600 may conclude.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   splitting an optical carrier signal into a first version and a second version, wherein the first version is orthogonal to the second version;
   re-combining predefined portions of the first version and the second version to determine a noise level;
   modulating at least one of the first version and the second version based on the noise level to reduce the noise level;
   after modulating the at least one of the first version and the second version based on the noise level, encoding data onto at least one of the first version and the second version; and
   recombining the first version and the second version to transmit the data.

2. The method of claim 1, wherein one of the first version and the second version is phase shifted by $\pi/2$ radians from the optical carrier signal.

3. The method of claim 1, wherein the noise level is determined based on a relative intensity noise identified in a feedback line based on a prior noise level between the first version and the second version.

4. The method of claim 1, wherein the noise level is determined independently of the data encoded onto the at least one of the first version and the second version.

5. The method of claim 1, wherein the at least one of the first version and the second version, based on the noise level, are modulated in a selected frequency band corresponding to a relaxation frequency of a laser generating the optical carrier signal.

6. A device, comprising:
   a first signal arm, including:
      a first input connected to a light source;
      a first output connected to a transmission line;
      a first set of signal modulators connected between the first input and the first output;
      a first Relative Intensity Noise (RIN) modulator connected between the first input and the first set of signal modulators; and
      a first tap connected between the first RIN modulator and the first set of signal modulators;
   a second signal arm, including:
      a second input connected to the light source;
      a second output connected to the transmission line;
      a second set of signal modulators connected between the second input and the second output;
      a second RIN modulator connected between the second input and the second set of signal modulators;
      a second tap connected between the second RIN modulator and the second set of signal modulators; and
   a logic circuit, connected to the first tap and the second tap configured to drive the first RIN modulator and the second RIN modulator based on a difference between signals carried by the first tap and the second tap.

7. The device of claim 6, wherein the first signal arm further includes a first phase shifter connected between the first input and the first RIN modulator, and wherein the second signal arm further includes a second phase shifter connected between the second input and the second RIN modulator.

8. The device of claim 7, wherein the first phase shifter applies an offset to optical signals carried therein with a difference of $\pi/2$ radians from an offset applied by the second phase shifter.

9. The device of claim 6, wherein the logic circuit is a trans-impedance amplifier connected via a loop filter to the first RIN modulator and the second RIN modulator.

10. The device of claim 9, wherein the logic circuit is included on a shared chip with the device.

11. The device of claim 9, wherein the loop filter receives input from the trans-impedance amplifier and provides output to at least one of the first RIN modulator and the second RIN modulator, wherein the loop filter and the trans-impedance amplifier are tuned to a relaxation frequency of the light source.

12. The device of claim 6, wherein the light source is a laser generating an optical carrier that is split onto the first signal arm and the second signal arm, wherein the first RIN modulator and the second RIN modulator are configured to reduce a RIN level of the optical carrier independently of data encoded on the signals carried over the first set of signal modulators and the second set of signal modulators.

13. The device of claim 6, wherein the first tap and the second tap are configured to carry a programmatically adjustable percentage of an amplitude of the signals carried on the first signal arm and the second signal arm respectively.

14. The device of claim 6, wherein one of the first set of signal modulators and the second set of signal modulators is powered to encode data onto an optical carrier signal and a different one of the first set of signal modulators and the second set of signal modulators is unpowered.

15. An optical signaling device, comprising:
a laser, configured to generate an optical carrier signal;
an interferometer, configured to receive the optical carrier signal from the laser;
a driver, configured to encode a data signal onto the optical carrier signal in the interferometer;
an interconnect, configured to receive an output from the interferometer; and
a trans-impedance amplifier, configured to receive a Relative Intensity Noise (RIN) level of the laser as measured within the interferometer and to drive a RIN modulator within the interferometer based on the RIN level to mitigate an amplitude of the RIN level.

16. The optical signaling device of claim 15, wherein the interferometer includes:
a first signal arm, including a first phase shifter, a first RIN modulator, and a first set of signal modulators;
a second signal arm, including a second phase shifter, a second RIN modulator, and a second set of signal modulators;
a splitter, having an input connected to the laser, a first output connected to the first signal arm, and a second output connected to the second signal arm; and
a combiner, having a first input connected to the first signal arm, a second input connected to the second signal arm, and an output connected to the interconnect.

17. The optical signaling device of claim 16, wherein one of the first set of signal modulators and the second set of signal modulators are driven by a driver to encode data on an optical carrier signal generated by the laser.

18. The optical signaling device of claim 16, further comprising:
a first tap disposed on the first signal arm downstream from the first phase shifter and the first RIN modulator, and upstream from the first set of signal modulators;
a second tap disposed on the second signal arm downstream from the second phase shifter and the second RIN modulator, and upstream from the second set of signal modulators;
a tap combiner configured to:
receive inputs from the first tap and the second tap;
combine the received inputs to produce an optical RIN level signal; and
an optical converter configured to convert the optical RIN level signal into an electrical RIN level signal; and
provide the electrical RIN level signal to the trans-impedance amplifier.

19. The optical signaling device of claim 16, further comprising:
a loop filter, configured to receive an output from the trans-impedance amplifier and select the RIN modulator from one of the first RIN modulator and the second RIN modulator.

20. The optical signaling device of claim 19, wherein the trans-impedance amplifier and the loop filter are tuned to a relaxation frequency of the laser.

* * * * *